United States Patent
Lisio (10) Patent No.: US 10,800,514 B2
(45) Date of Patent: *Oct. 13, 2020

(54) SINGLE LEVER POWERPLANT CONTROL ON TWIN TURBOPROPELLER AIRCRAFT

(71) Applicant: PRATT & WHITNEY CANADA CORP., Longueuil (CA)

(72) Inventor: Carmine Lisio, Laval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,758

(22) Filed: Jul. 24, 2018

(65) Prior Publication Data

US 2018/0327083 A1  Nov. 15, 2018

Related U.S. Application Data

(63) Continuation of application No. 15/459,742, filed on Mar. 15, 2017, now Pat. No. 10,059,432.

(60) Provisional application No. 62/462,090, filed on Feb. 22, 2017.

(51) Int. Cl.
| | |
|---|---|
| *B64C 11/50* | (2006.01) |
| *B64D 31/12* | (2006.01) |
| *B64C 11/30* | (2006.01) |
| *B64C 27/08* | (2006.01) |
| *B64C 27/12* | (2006.01) |

(Continued)

(52) U.S. Cl.
CPC ............ *B64C 11/50* (2013.01); *B64C 11/305* (2013.01); *B64D 31/00* (2013.01); *B64D 31/12* (2013.01)

(58) Field of Classification Search
CPC ....... B64C 11/50; B64C 11/305; B64D 31/12; B64D 31/00
USPC .......................................................... 701/3
See application file for complete search history.

(56) References Cited

U.S. PATENT DOCUMENTS

| | | |
|---|---|---|
| 617,055 A | 1/1899 | Schnepper |
| 2,612,226 A | 9/1952 | Crum |
| 2,697,908 A | 12/1954 | Offner |

(Continued)

FOREIGN PATENT DOCUMENTS

| | | |
|---|---|---|
| WO | 9951868 | 10/1999 |
| WO | 2016055039 | 4/2016 |

OTHER PUBLICATIONS

L.C. Prevallet: "Single Lever Power Management of Turboprop Engines", SAE Technical Paper Series, vol. 1, Sep. 23, 1991 (Sep. 23, 1991), XP055462224, US ISSN: 0148-7191, DOI: 10.4271/912200.

(Continued)

*Primary Examiner* — Marthe Y Marc-Coleman
(74) *Attorney, Agent, or Firm* — Norton Rose Fulbright Canada, LLP (57) ABSTRACT

Herein provided are methods and systems for controlling operation a first propeller of an aircraft, the first propeller associated with a first engine, the aircraft further comprising a second propeller associated with a second engine. A first requested engine power for the first engine is obtained. A second requested engine power for the second engine is obtained. The first propeller is synchronized with the second propeller by setting a first propeller command for the first propeller based on the first and second requested engine power, and the first propeller command is sent for the first propeller.

10 Claims, 8 Drawing Sheets

(51) Int. Cl.
*B64D 31/06* (2006.01)
*B64D 31/00* (2006.01)

(56) References Cited

U.S. PATENT DOCUMENTS

| | | | |
|---|---|---|---|
| 2,740,483 | A | 4/1956 | Machlanski |
| 2,964,112 | A | 12/1960 | Gunberg |
| 3,689,175 | A * | 9/1972 | Hartzell ............... B64C 11/50 416/34 |
| 5,148,402 | A | 9/1992 | Magliozzi et al. |
| 5,165,240 | A | 11/1992 | Page et al. |
| 5,315,819 | A | 5/1994 | Page et al. |
| 5,416,699 | A | 5/1995 | DiValentin et al. |
| 5,810,560 | A | 9/1998 | Tanaka |
| 6,004,098 | A | 12/1999 | Chevallier et al. |
| 6,171,055 | B1 | 1/2001 | Vos et al. |
| 6,224,021 | B1 | 5/2001 | Tanaka |
| 6,340,289 | B1 | 1/2002 | Vos et al. |
| 6,379,114 | B1 | 4/2002 | Schott et al. |
| 6,468,035 | B1 | 10/2002 | Otake et al. |
| 6,652,233 | B2 | 7/2003 | Otake |
| 7,011,498 | B2 | 3/2006 | Vos et al. |
| 7,854,283 | B2 | 12/2010 | Vos et al. |
| 7,931,231 | B2 | 4/2011 | Cherepinsky et al. |
| 8,566,000 | B2 | 10/2013 | Lickfold et al. |
| 8,651,811 | B2 | 2/2014 | Danielson |
| 9,008,943 | B2 | 4/2015 | Lickfold et al. |
| 9,045,220 | B2 | 6/2015 | Yamasaki |
| 9,150,303 | B2 | 10/2015 | Guida et al. |
| 9,157,377 | B2 | 10/2015 | Lickfold et al. |
| 2007/0084963 | A1 | 4/2007 | Nouhaud |
| 2008/0006739 | A1 | 1/2008 | Mochida et al. |
| 2008/0019804 | A1 | 1/2008 | Toyoda |
| 2008/0029653 | A1 | 2/2008 | Johnson |
| 2009/0287382 | A1 | 11/2009 | Blum et al. |
| 2012/0234968 | A1 * | 9/2012 | Smith ............... B64C 29/0033 244/12.3 |
| 2013/0134256 | A1 | 5/2013 | Gaillard |
| 2015/0001336 | A1 * | 1/2015 | Eglin ............... B64C 27/04 244/6 |
| 2015/0100186 | A1 | 4/2015 | Clesceri |
| 2015/0113996 | A1 | 4/2015 | Cai et al. |
| 2015/0314853 | A1 | 11/2015 | Tantot et al. |
| 2016/0069277 | A1 | 3/2016 | Meisner et al. |
| 2016/0159461 | A1 * | 6/2016 | Lu ............... B64C 11/305 416/1 |
| 2016/0229547 | A1 | 8/2016 | Fisher et al. |
| 2017/0081038 | A1 | 3/2017 | Looper et al. |
| 2018/0134405 | A1 * | 5/2018 | Widmer ............... B64D 31/12 |

OTHER PUBLICATIONS

Jeffrey L. Musgrave: "Single-Lever Power Control for General Aviation Aircraft Promises Improved Efficiency and Simplified Pilot Controls How Does a Single Lever Work to Control an Internal Combustion Engine?", Jan. 1, 1997 (Jan. 1, 1997), XP055462213, Retrieved from the Internet: URL:https://ntrs.nasa.gov/archive/nasa/casi.ntrs.nasa.gov/20050177918.pdf [retrieved on Mar. 23, 2018].
Charles Kim: "EECE 499/693: Computers and Safety Critical Systems 4 Design of Fail-Safe Computer System", Nov. 20, 2014 (Nov. 11, 2014), XP055462254, Retrieved from the Internet: URL:http://www.mwftr.com/CS2/CS2_F14_06_Chap4%20Fail%20Safe%20Computer%20System_Dual.pdf [retrieved on Mar. 23, 2018].
European Patent Office, European Search Report, Apr. 16, 2018, 10 pages, Application No. 18157799.0.
Office Action dated Aug. 12, 2019 in connection with European Application No. 18157799.0.

* cited by examiner

SINGLE LEVER POWERPLANT CONTROL ON TWIN TURBOPROPELLER AIRCRAFT

CROSS-REFERENCE TO RELATED APPLICATIONS

The present application is a continuation of U.S. patent application Ser. No. 15/459,742 filed on Mar. 15, 2017 and which claims the benefit of U.S. Provisional Patent Application No. 62/462,090 filed on Feb. 22, 2017, the contents of which are hereby incorporated by reference in their entirety.

TECHNICAL FIELD

The present disclosure relates generally to engine control, and, more particularly, to engine and propeller control in aircraft.

BACKGROUND OF THE ART

A propeller-driven aircraft powerplant consists of two principal and distinct components: an engine and a propeller. An engine control system is used to modulate the power output of the engine, for example by controlling fuel flow to the engine. Similarly, a propeller control system is used to modulate the thrust produced by the propeller, for example by changing a propeller rotational speed and/or a propeller blade pitch. In traditional propeller driven aircraft, each of the engine control system and the propeller control system is operated by a pilot or other operator using a respective lever for each of the powerplant components: thus, a throttle lever is used to set a desired engine power output, and a condition lever is used to set a desired propeller rotational speed and blade pitch angle, thereby modulating the thrust output. In addition, modern turbopropeller driven aircraft operate the propeller at predefined fixed propeller rotational speeds, optimized to a flight phase of the aircraft.

However, the presence of multiple levers for each principal components of each powerplant can lead to additional work load for the pilot, especially in cases where the aircraft has multiple engines, such as twin turbopropeller aircraft.

As such, there is room for improvement.

SUMMARY

In one aspect, there is provided a method for controlling operation a first propeller of an aircraft, the first propeller associated with a first engine, the aircraft further comprising a second propeller associated with a second engine. A first requested engine power for the first engine is obtained. A second requested engine power for the second engine is obtained. The first propeller is synchronized with the second propeller by setting a first propeller command for the first propeller based on the first and second requested engine power, and the first propeller command is sent for the first propeller.

In another aspect, there is provided a system for controlling operation of at least a first propeller of an aircraft, the first propeller associated with a first engine, the aircraft further comprising a second propeller associated with a second engine. The system comprises at least one processing unit and a non-transitory computer-readable memory having stored thereon program instructions. The program instructions are executable by the at least one processing unit for obtaining a first requested engine power for the first engine, obtaining a second requested engine power for the second engine, synchronizing the first propeller with the second propeller by setting a first propeller command for the first propeller based on the first and second requested engine power, and sending the first propeller command for the first propeller.

In a further aspect, there is provided an aircraft subsystem comprising a first engine, a first propeller, and a first unified control lever associated with the first engine and the first propeller, a second engine, a second propeller, and a second unified control lever associated with the second engine and the second propeller, a first engine control system configured for controlling the first engine and the first propeller based on a first command from the first unified control lever, and a second engine control system configured for controlling the second engine and the second propeller based on a second command from the second unified control lever. At least one of the first engine control system and the second engine control system is configured for synchronizing the first propeller and the second propeller using the first command from the first unified control lever and the second command from the second unified control lever.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
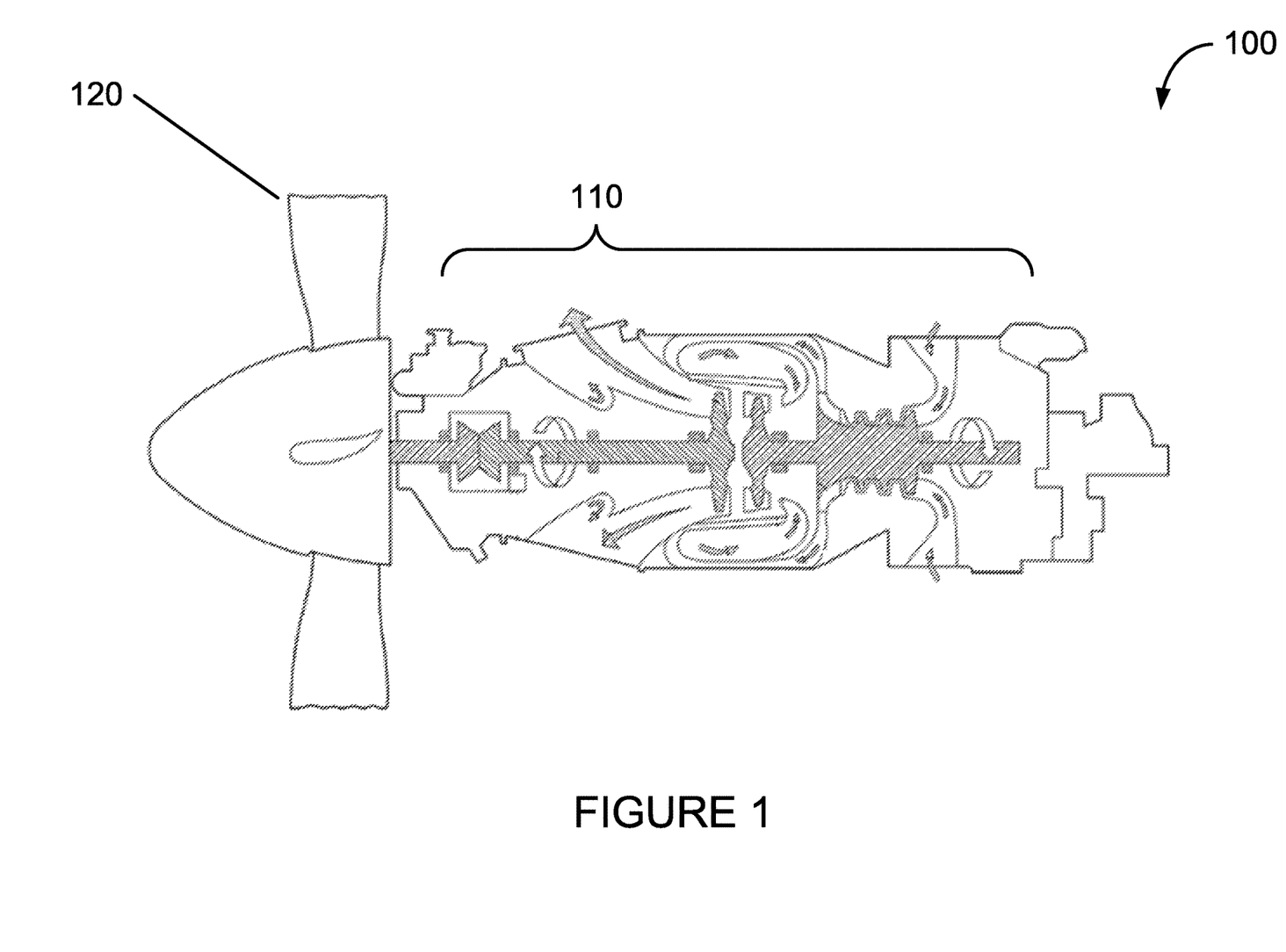
FIG. 1 is a schematic cross-sectional view of an example engine of an aircraft.

With reference to FIG. 1, there is illustrated a turbopropeller powerplant 100 for an aircraft of a type preferably provided for use in subsonic flight, generally comprising an engine 110 and a propeller 120. The propeller 120 converts rotary motion from a shaft of the engine 110 to provide propulsive force for the aircraft, also known as thrust. The powerplant 100 of FIG. 1 is a turboprop, but the engine 110 could also be any other type of engine mated to a propeller 120, such as a piston engine, and the like.

Operation of the engine 110 and of the propeller 120 can be regulated by a pilot or other operator by way of various powerplant controls. Traditionally, a turbopropeller driven aircraft is provided with a throttle lever (also referred to as a power lever), which is used to regulate the output power of the engine 110, and a condition lever, which is used to regulate the propeller rotational speed and blade pitch angle thereby modulating thrust produced by the propeller 120. For instance, the aircraft can include one throttle lever and one condition lever per powerplant 100. For example, a twin turbopropeller aircraft having two separate powerplants 100 can have two throttle levers and two condition levers.

The present disclosure considers the use of a unified control lever (UCL) to control both the output power of the engine 110 and the thrust produced by the propeller 120.

Figure 2A:
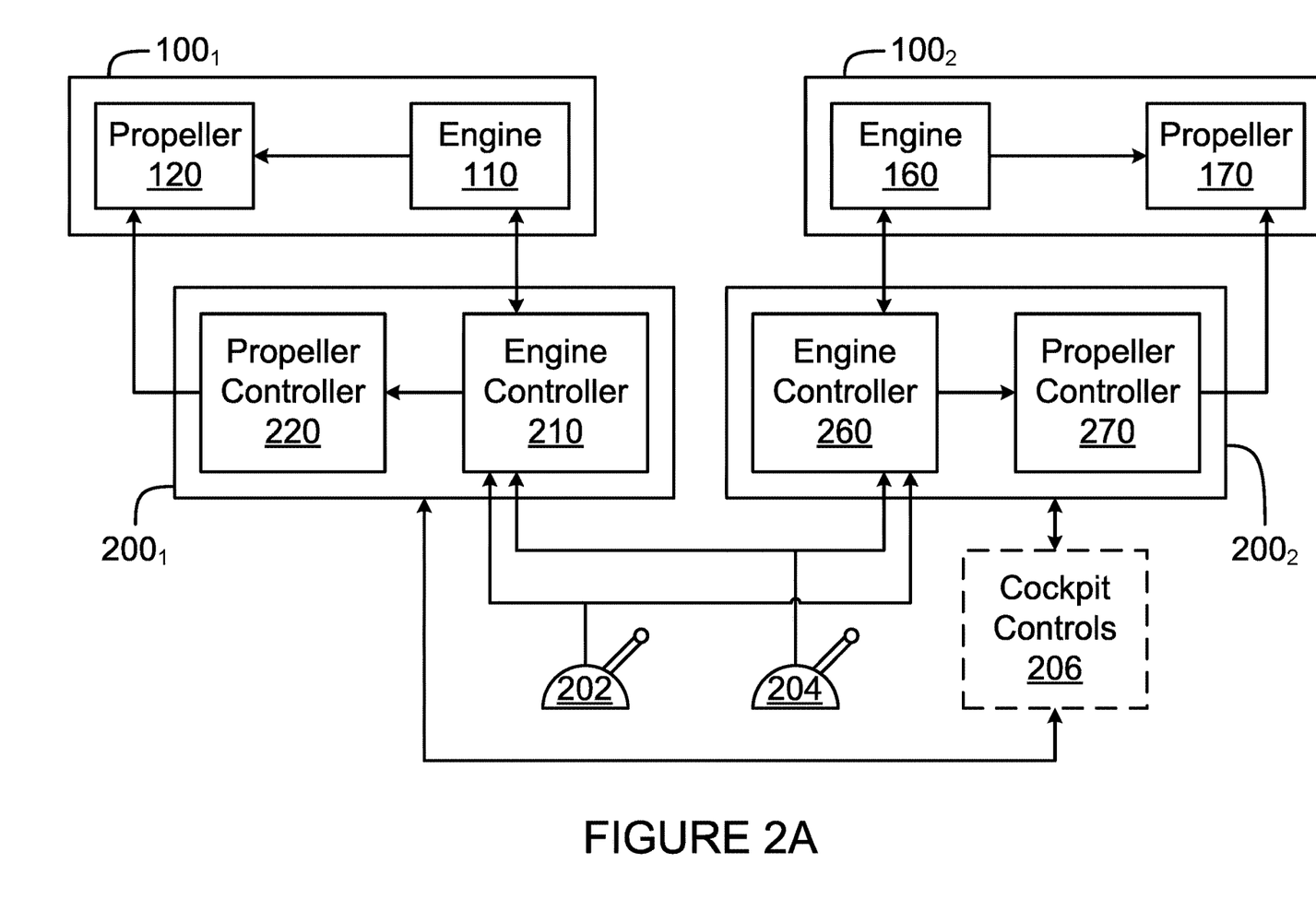
FIGS. 2A-D are block diagrams of example powerplant control system configurations.

With reference to FIG. 2A, a first powerplant control system (PCS) $200_1$ and a second PCS $200_2$ are shown. PCS $200_1$, $200_2$ are configured for controlling operation of aircraft powerplants $100_1$ and $100_2$, respectively, each having an engine 110, 160, and a propeller 120, 170. PCS $200_1$ is configured for receiving input from a first UCL 202, which is associated with the first powerplant $100_1$, and from a second UCL 204, which is associated with the second powerplant $100_2$. Similarly, PCS $200_2$ is configured for receiving input from first and second UCLs 202, 204. Optionally, the PCS $200_1$, $200_2$ are further configured for receiving additional input from cockpit controls 206.

The UCLs 202, 204 each provide to PCS $200_1$, $200_2$ a respective lever position, for example based on the angle of the lever vis-à-vis a predetermined reference position. In addition, in some embodiments the cockpit controls 206 include buttons, switches, dials, or other discrete-type input mechanisms which may be located on or proximate the UCLs 202, 204 and which can provide additional input to the PCS $200_1$, $200_2$. For example, the discrete-type input mechanisms can provide information regarding the propeller reference speed, fuel on/off, propeller feather/unfeather, and the like. The lever position, and optionally the additional input from the cockpit controls 206, can be provided to each one of PCS $200_1$, $200_2$ using any suitable signalling protocol and over any suitable communication medium. In some embodiments, each one of PCS $200_1$, $200_2$ receives the lever position and the additional input via one or more wires, either as a digital signal or as an electrical analog signal. In other embodiments, the UCLs 202, 204 can communicate the lever position and the cockpit controls 206 can communicate the additional input to PCS $200_1$, $200_2$ over one or more wireless transmission protocols. In some embodiments, an aircraft will have one UCL per engine powerplant.

PCS $200_1$, $200_2$ each include an engine controller 210, 260, and a propeller controller 220, 270. The engine controllers 210, 260 are configured for receiving the lever positions from each of the UCLs 202, 204, and optionally the additional input from the cockpit controls 206. The lever position and the additional input can be transmitted from the UCLs 202, 204 and from the cockpit controls 206 to the engine controller 210, 260 in any suitable fashion and using any suitable communication protocol. The following discussion focuses on the operation of one of the engine controllers, namely engine controller 210, but it should be understood that engine controller 260 may be configured to perform similar operations.

The engine controller 210 is configured for processing the lever positions for associated UCL 202, and any additional input from the cockpit controls 206, to obtain a requested engine output power for the engine 110. Based on the requested engine output power, the engine controller 210 produces an engine control signal which is sent to the associated engine 110 to control the operation of the engine 110. In some embodiments, the engine control signal modulates a flow of fuel to the engine 110. In other embodiments, the engine control signal alters the operation of a gear system of the engine 110. Still other types of engine operation control are considered.

The engine controller 210 is further configured for processing the lever position and any additional input received from the UCL 204 and from the cockpit controls 206 to obtain a requested engine output power for the engine 160. Put differently, the engine controller 210 will process the lever position for both UCLs 202, 204, and optionally the additional input from the cockpit controls 206 to obtain two separate requested engine output power, one for the engine 110 and one for the engine 160. The engine controller 260 may also be configured to obtain the requested engine output power for the engines 110, 160.

Then, based on the requested engine output power for the engine 160 as derived from UCL 204, the engine controller 210 can determine a first propeller command for the propeller 120. For example, the engine controller 210 can use a lookup table, an algorithm, or any other suitable methodology to determine the required rotational speed by the propeller 120 based on the requested engine output power for the engine 160, which in turn can inform the propeller controller 220 on required propeller rotational speed and/or blade pitch angle for the propeller 120. In some embodiments, the engine controller 210 determines a propeller governing speed reference via a lookup table or algorithm. The engine controller 210 determines the propeller governing speed reference for the propeller 120 to ensure that the propeller governing speed references for the propeller 120 and the propeller 170 are synchronized. In some embodiments, synchronization of the propeller governing speed references for the propeller 120 and the propeller 170 requires that the propeller governing speed references are the same for both propellers 120, 170. Put differently, the engine controller 210 sets the first propeller command for the first propeller 120 to cause the first propeller 120 to operate based on the requested power for the second engine 160, causing the propellers 120, 170 to operate in a follower-leader configuration.

In some embodiments, the selection of the propeller governing speed references is a function of the lever position for the UCL 204 which has a plurality of transition points or "breakpoints" at which requested propeller governing speeds change, and optionally of the cockpit controls 206. The breakpoints may align with aircraft flight modes or phases, or with certain emergency conditions. For example, in situations where one or more propellers are to be secured either via feathering or by shutting down the powerplant(s) associated with the one or more propellers.

Figure 3:
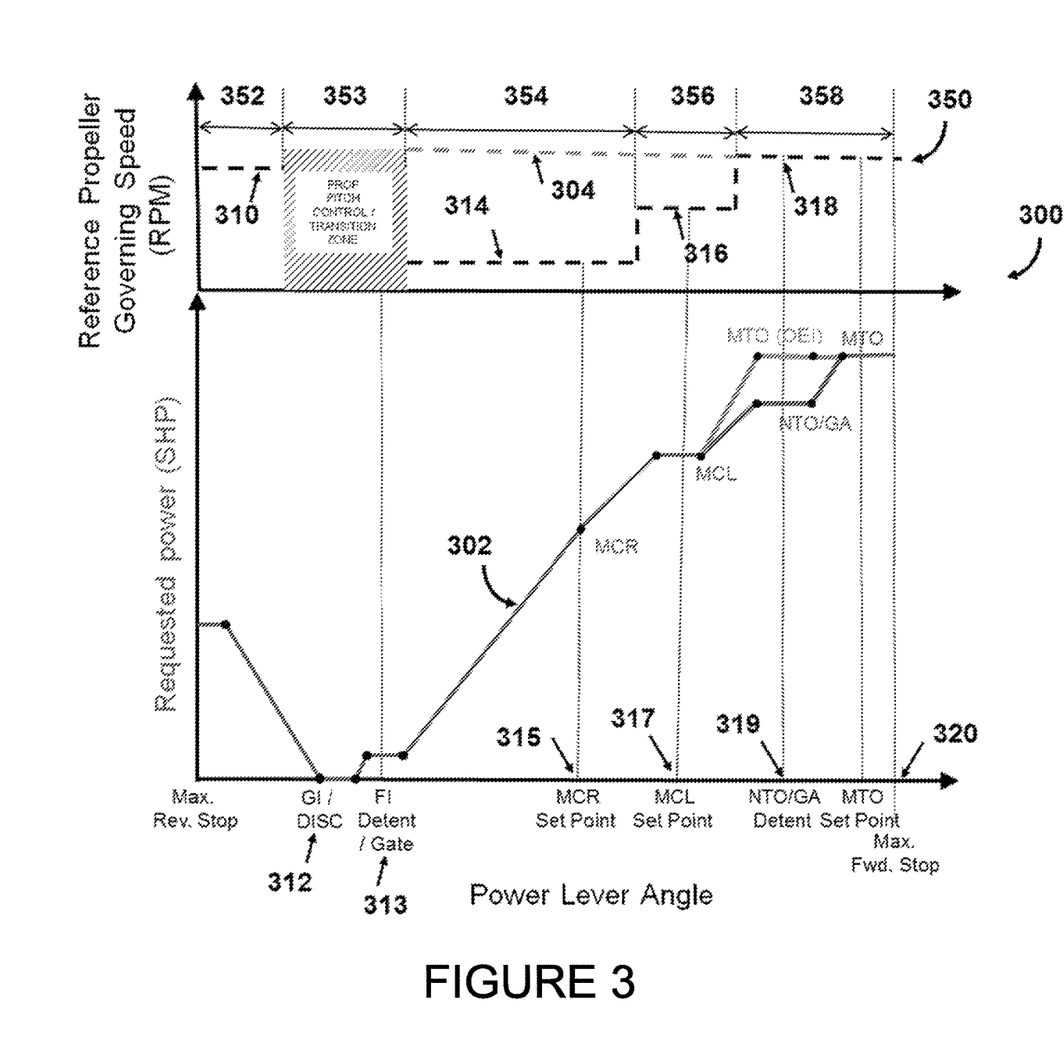
FIG. 3 is a graphical representation of example requested power and requested propeller governing speed curves.

For example, and with reference to FIG. 3, a lookup table 300 can be used to map the requested engine power and/or the propeller thrust to a requested propeller governing speed. A curve 302 shows a relationship between the lever angle for a UCL (horizontal axis) and the requested power for an engine (vertical axis), for example the UCL 202 and the engine 110, and a curve 350 shows a relationship between the lever angle for the UCL (horizontal axis) and the requested propeller governing speed for a propeller (vertical axis), for example the propeller 120. The curve 302 is aligned with the curve 350, which share a common horizontal axis, and points on the curve 302 can be mapped with a relation to points on the curve 350.

For example, a first section 352 of the curve 350 dictates the reference propeller governing speed 310 between a maximum reverse position setpoint 311 and ground idle gate (GI) 312. A second section 353 is implemented to adjust the reference propeller governing speed between the GI gate and a flight idle gate (FI) detent 313. In this zone, the propeller control system blade angle is adjusted directly for a smooth transition and the transition point can vary as a function principally of forward speed. A third section 354 dictates the reference propeller governing speed 314 between the FI gate 313 and an intermediate point between a maximum cruise (MCR) set point 315 and a maximum climb (MCL) set point 317. A fourth section 356 dictates the requested propeller governing speed 316 between the intermediate point between MCR set point 315 and MCL set point 317 and an intermediate point between the MCL set point 317 and a normal takeoff (NTO) detent 319. A fifth section 358 dictates the requested propeller governing speed 318 between the intermediate point between MCL set point 317 and NTO detent 319 and a maximum forward UCL position 320. In some embodiments, an alternate curve 304 can be followed in case of an unexpected event for one of the engines. Other methods of translating the requested engine power and/or the propeller thrust are also considered.

Referring again to FIG. 2A, the engine controller 210 is further configured for sending the first propeller command to the first propeller 120. In the embodiment of FIG. 2A, the engine controller 210 is configured to send the first propeller command to the propeller controller 220, which in turn uses the first propeller command to control operation of the propeller 120. For example, the propeller controller 220 produces a propeller control signal indicative of the first propeller command and sends the propeller control signal to the propeller 120 to alter a propeller blade pitch, a rotational governing speed, or any other suitable propeller operating condition.

As discussed hereinabove, some or all the functionality which is implemented by the engine controller 210 may be mirrored by the engine controller 260. In some embodiments, the engine controller 260 receives the lever positions for the UCL 204 and optionally any additional information from the cockpit controls 206, obtains the requested engine power for the engine 160, sets a second propeller command for the second propeller 170 based on second requested engine power, and sends the second propeller command to the second propeller 170, for example via the propeller controller 270. Since both engine controllers 210, 260 perform the same functionality with respect to propeller governing speed reference based on the same inputs, i.e. the input received from the UCL 204 and any additional input from the cockpit controls 206, the operation of the propellers 120, 170 is synchronized. This ensures that even in the case of a mismatch of requested engine power for the engines 110, 160, the operation of the propellers 120, 170 is synchronized, thereby avoiding undesirable propeller speed mismatch for the aircraft. For example, if the UCLs 202, 204 are positioned at different angles, for example by the pilot, leading to different requested engine power for the engines 110, 160 and basic propeller governing speed settings, the engine controllers 210, 260 can correct the imbalance by adjusting the propeller governing speed reference, for example by setting first and second propeller commands to result in common propeller rotation speeds for both propellers 120, 170. In some embodiments, this synchronization can be overridden, for example by a pilot or other operator, or by other control systems, for example in emergency situations.

The synchronization of the operation of the propellers 120, 170 can be performed in one or more fashions. In some embodiments, if the first requested engine power for engine 110 is lower than the second requested engine power for engine 160 and, for example, if the rotational governing speed for the first propeller 120 is lower than for the second propeller 170, the first propeller command is set to increase the rotational speed of the propeller 120 to the rotational speed of the propeller 170. In another embodiment, if the first requested engine power for engine 110 is lower than the second requested engine power for engine 160 and, for example, if the rotational governing speed for the first propeller 120 is lower than for the second propeller 170, the first propeller command is set to increase the rotational speed of the propeller 120 to the rotational speed of the propeller 170. Still other synchronization techniques are considered. In some embodiments, the synchronization technique used depends on the requested engine power for the engines 110, 160, based on propeller thrust for the propellers 120, 170, and/or based on any additional input provided by the cockpit controls 206.

In some embodiments where the aircraft has additional powerplants beyond the powerplants $100_1$, $100_2$, the PCS $200_1$, includes one engine-controller-and-propeller-controller pair for each additional powerplant present in the aircraft. In other embodiments, the PCS $200_1$, includes only the two engine-controller-and-propeller-controller pairs 210, 220 and 260, 270, that is to say one engine-controller-and-propeller-controller pair for each side or wing of the aircraft. In still further embodiments, the PCS $200_1$, includes any suitable number of engine-controller-and-propeller-controller pairs. In embodiments where an aircraft has a plurality of powerplants 100 for each side or wing of the aircraft, a first side can be designated as leader, and the second side is designated as follower, such that the propellers of the second side are synchronized to match the operation of the propellers of the first side. In addition, in some embodiments, each of the additional powerplants is associated with a respective UCL, such that there are an equal number of powerplants and UCLs.

Figure 2B:
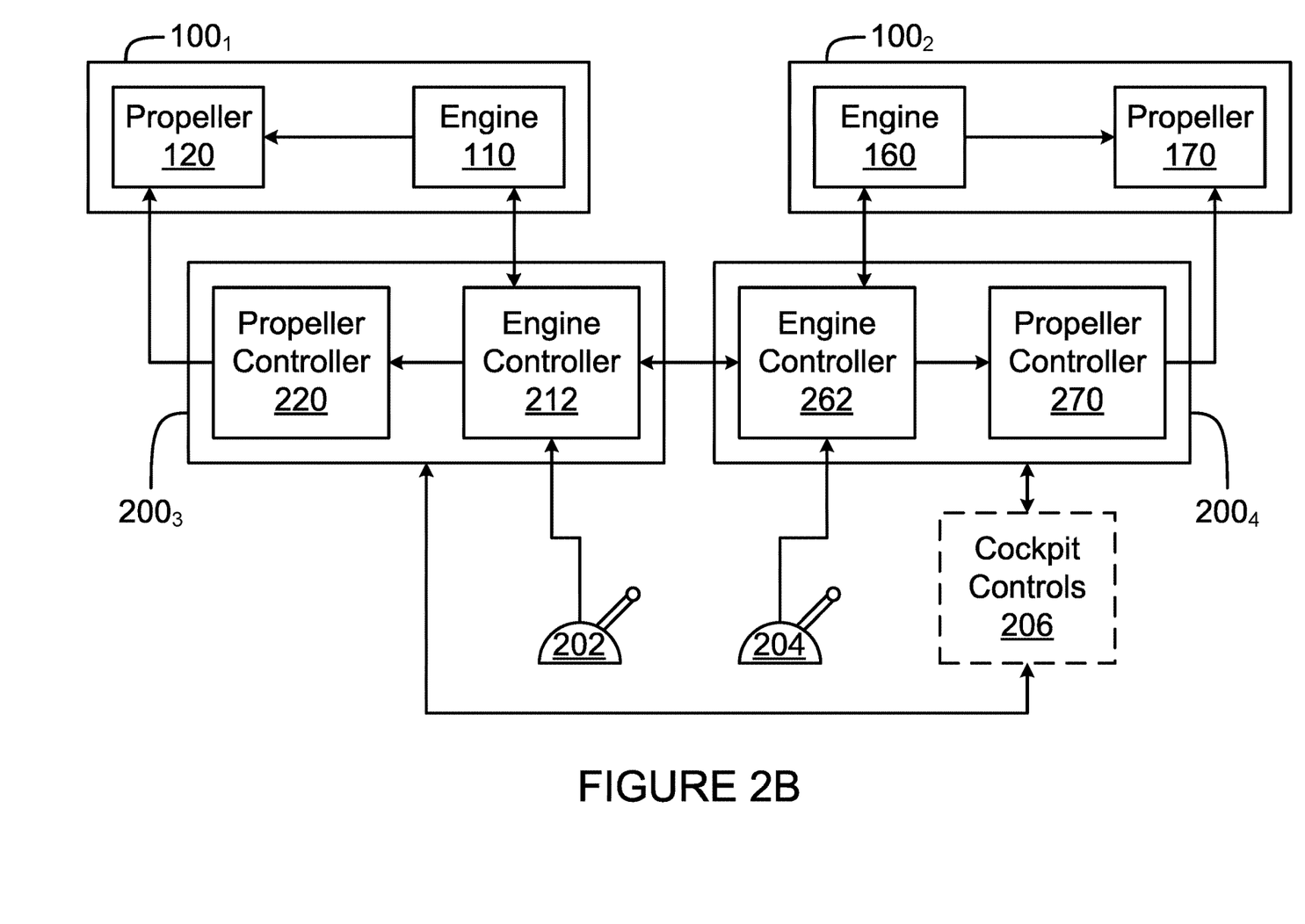

With reference to FIG. 2B, in some embodiments PCS $200_3$, $200_4$ are provided, each including a respective engine controller 212, 262. The engine controllers 212, 262 are configured to receive the lever position from a respective one of the UCLs 202, 204 and optionally the additional input from the cockpit controls 206. In addition, the engine controllers 212, 262 are configured for communicating with one-another. For example, if the propeller 120 is the follower to the propeller 170, which is the leader, the engine controller 212 can obtain the requested engine power for the engine 110 associated with the propeller 120 from the received lever position of the UCL 202, and can communicate with the engine controller 262 to obtain the requested propeller governing reference for the propeller 170. In some embodiments, the engine controller 262 can provide the requested engine power for the engine 160 to the engine controller 212 directly. In other embodiments, the engine controller 262 provides the received lever position of the UCL 204 and any other additional data to the engine controller 212, which can be used by the engine controller 212 to determine the requested engine power for the engine 160.

Figure 2C:
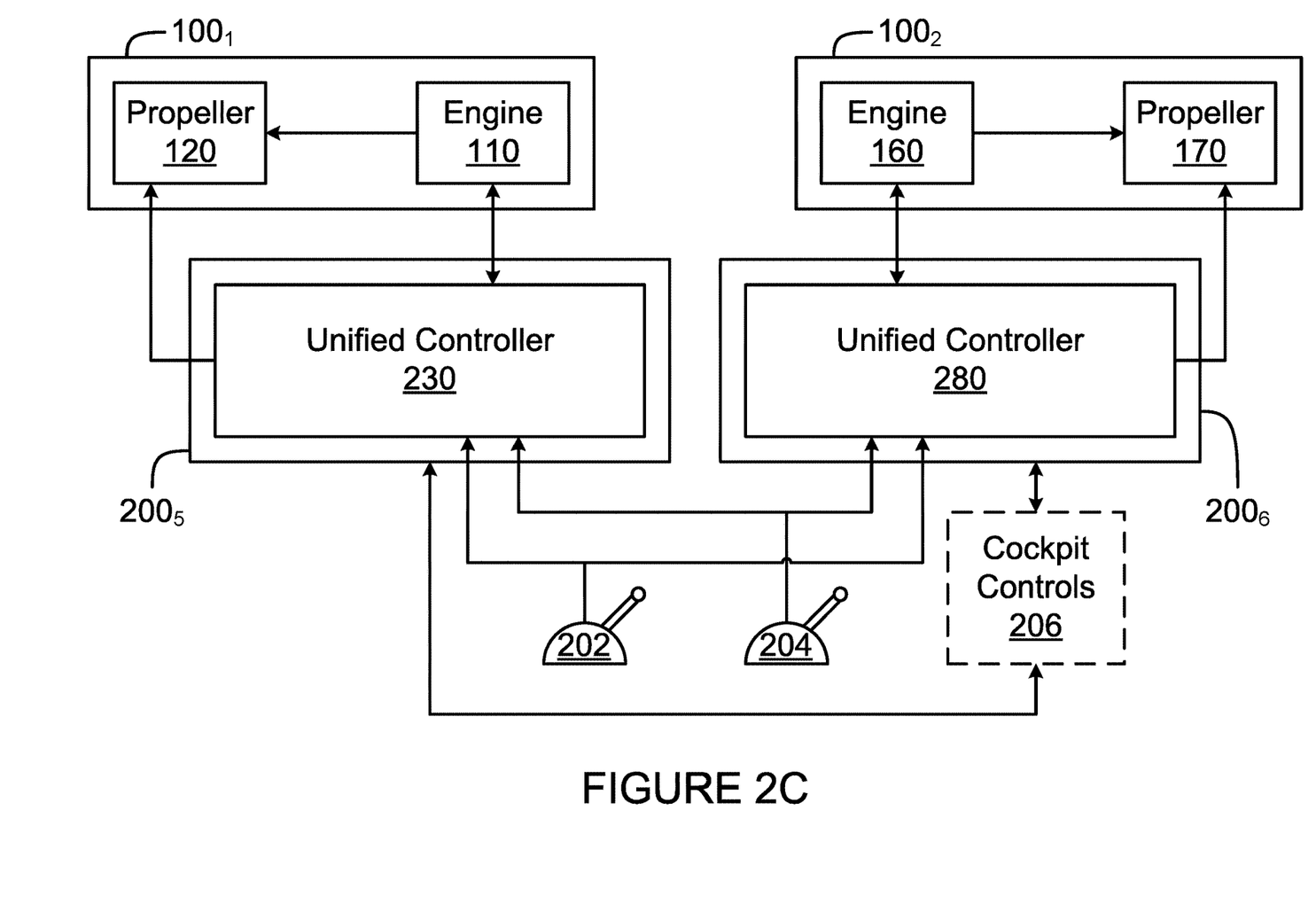

With reference to FIG. 2C, in some embodiments PCS $200_5$, $200_6$ are provided, each having a respective unified controller 230, 280. Each unified controller 230, 280 is configured for implementing the functionality of one of the engine controllers 210, 260, and one of the propeller controllers 220, 270. In embodiments where the propeller 120 is the follower to the propeller 170, the unified controller 230 is configured to receive the lever positions for the UCLs 202, 204, obtain the requested engine power for the engines 110, 160, set a first propeller command for the first propeller 120 based on the second requested engine power, and send the first propeller command to the propeller 120. The unified controller 280 can implement similar functionality for the engine 160 and the propeller 170.

Figure 2D:
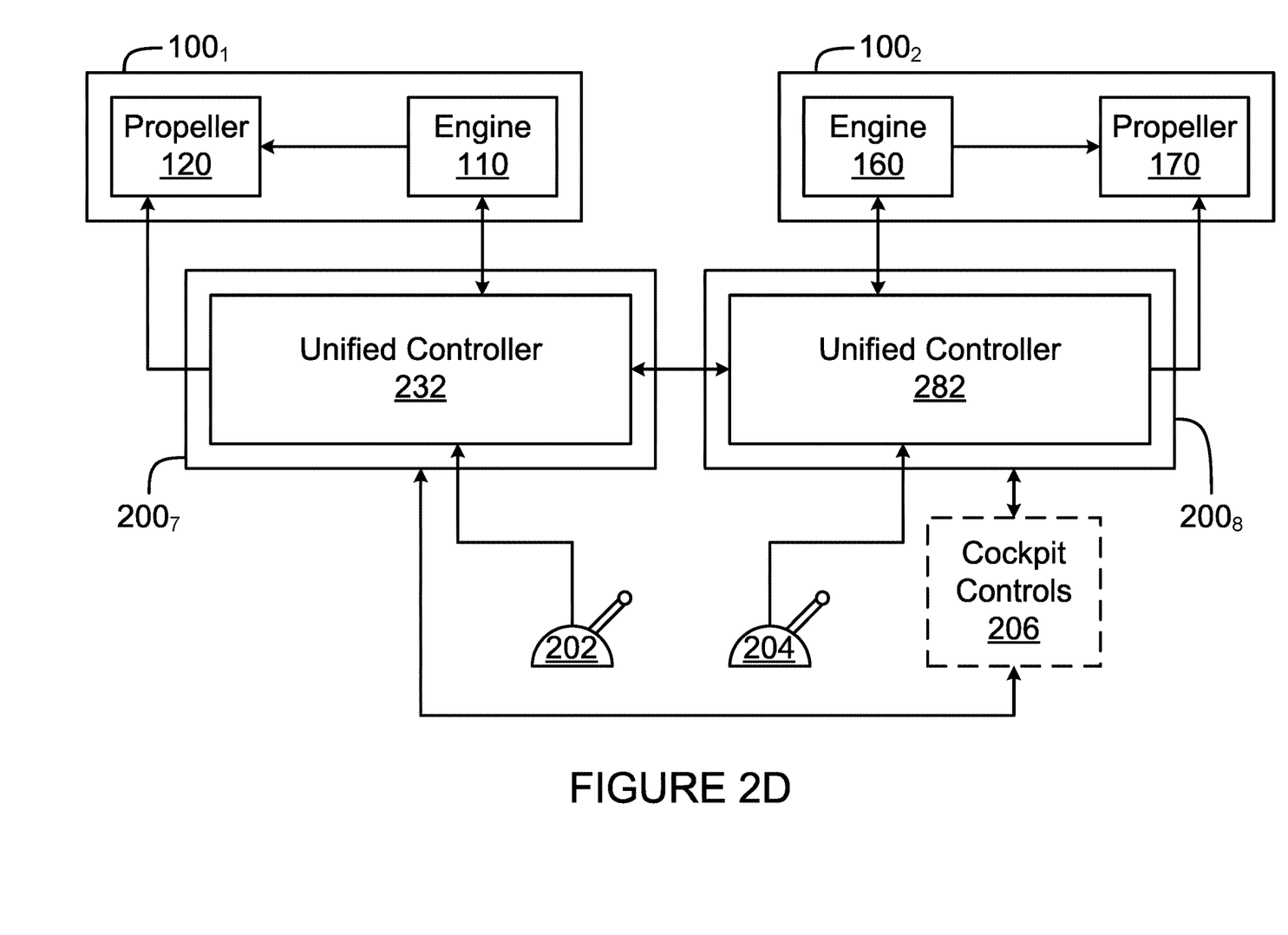

With reference to FIG. 2D, in some embodiments PCS $200_7$, $200_8$ are provided, each having a unified controller 232, 282. Each unified controller 232, 282 is configured for implementing the functionality of one of the engine controllers 212, 262, and one of the propeller controllers 212, 262. The unified controller 232 is configured to receive the lever position from the UCL 202 and any additional information from the cockpit controls 206, and to communicate with the unified controller 282 to obtain the requested engine power for the engine 160, either directly or based on the lever position and any additional information for the UCL 204 this is then used by unified controller 232 to set the propeller governing speed for propeller 120.

In each of the embodiments of FIGS. 2A-D, the operation of the propellers 120, 170 is synchronized based on the lever positions of the UCL 204, and any additional inputs provided via the cockpit controls 206, to ensure that the various powerplants 110₁, 110₂ are operating the propellers 120, 170 in a synchronized manner. In some embodiments, this is done by ensuring that the same propeller governing speed reference is used for both propellers 120, 170. Additionally, while propeller 120 is designated as the follower to propeller 170, which is the leader, it should be noted that in other embodiments or configurations either of the propellers 120, 170 can be designated as the leader, with the other as the follower.

Figure 4:
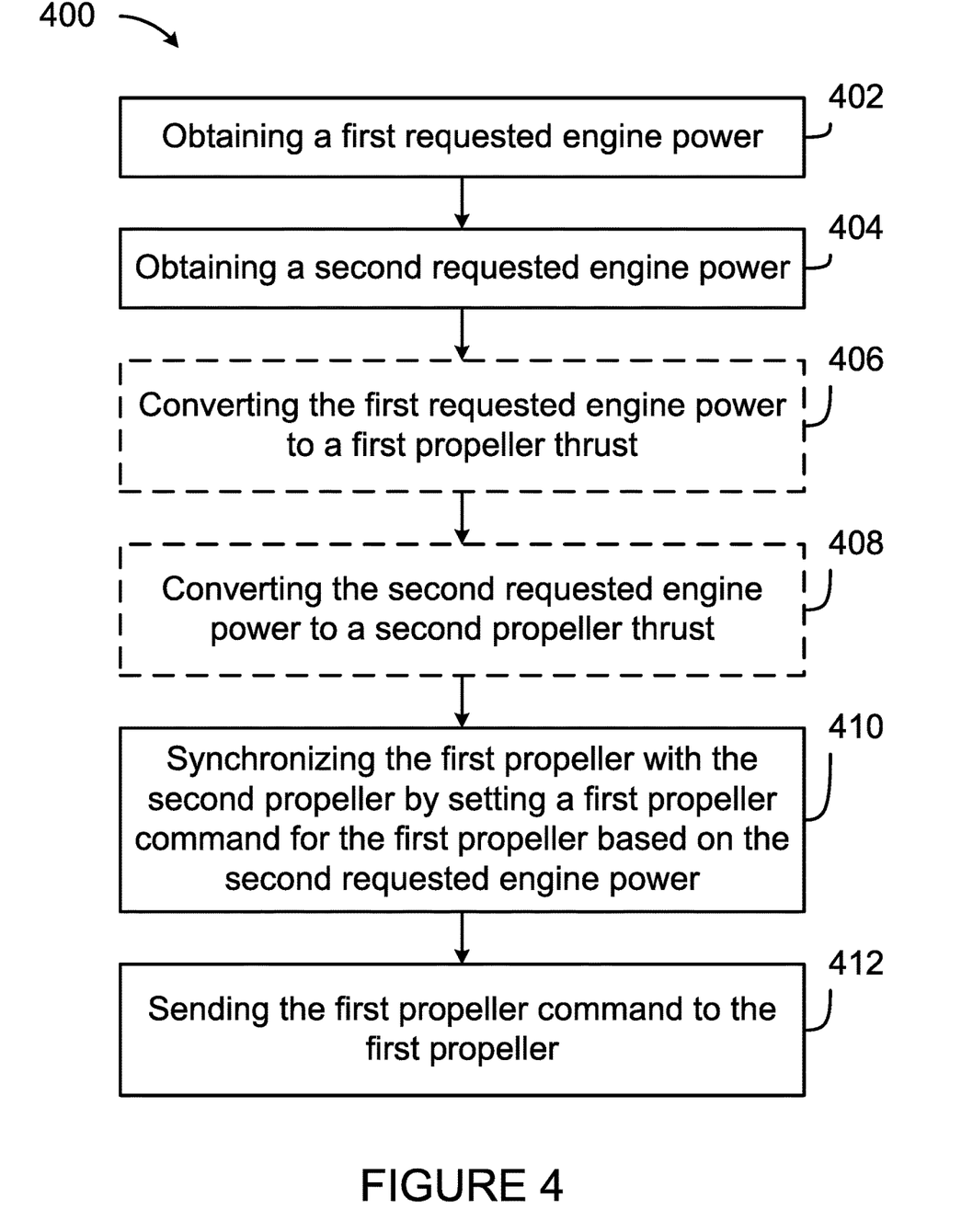
FIG. 4 is a flowchart illustrating an example method for controlling the operation of a propeller of an aircraft in accordance with an embodiment.

With reference to FIG. 4, there is shown a flowchart illustrating an example method 400 for controlling operation of a first propeller of an aircraft. The method 400 can be implemented by the engine controllers 210, 212, or by the unified controllers 230, 232 hereinafter referred to as an engine control system, in embodiments where the propeller 120 is a follower to the propeller 170. At step 402, the engine control system obtains a first requested engine power, for example for the engine 110. The first requested engine power can be obtained from a lever angle of a first unified control lever, for example the UCL 202. In some embodiments, the engine control system uses a lookup table or algorithm or other technique to translate the lever angle into the requested engine power.

At step 404, the engine control system obtains a second requested engine power, for example for the engine 160. The second requested engine power can be obtained from a lever angle of a second unified control lever, for example the UCL 204. In some embodiments, the engine control system uses a lookup table or algorithm or other technique to translate the lever angle into the requested engine power. Alternatively, the second requested engine power can be obtained from a separate engine control system, for example the engine controllers 260, 262 or the unified controllers 280, 282, either as a lever angle or as the requested engine power itself.

At step 406, optionally the engine control system converts the first requested engine power to a first propeller thrust. At step 408, optionally the engine control system converts the second requested engine power to a second propeller thrust. The conversion of the first and second requested engine power to first and second propeller thrust can be performed with the use of a lookup table, an algorithm, or any other suitable technique. In some embodiments, converting the requested engine power to propeller thrust is based at least in part on additional input received from the UCL 202, 204.

At step 410, the engine control system sets a first propeller command for a first propeller, for example propeller 120, based on the second requested engine power. In particular, the first propeller command is set so as to synchronize the operation of the first propeller with the operation of a second propeller, for example propeller 170. The synchronization of the operation of the first and second propellers 120, 170 ensures that undesirable propeller governing speed mismatch are avoided by having both the first and second propellers adjust their respective propeller speeds to cause the propellers 120, 170 to rotate in a synchronized fashion. Therefore, even if the first and second requested engine power are different, the engine control system can correct for the propeller governing speed mismatch by setting an appropriate first propeller command to produce equivalent behaviour for the first and second propellers.

At step 412, the first propeller command is sent to the first propeller 120. The first propeller command can be sent using any suitable means and any suitable protocol. For example the command can be sent using fly-by-wire technology and/or fly-by-wireless technology.

Figure 5:
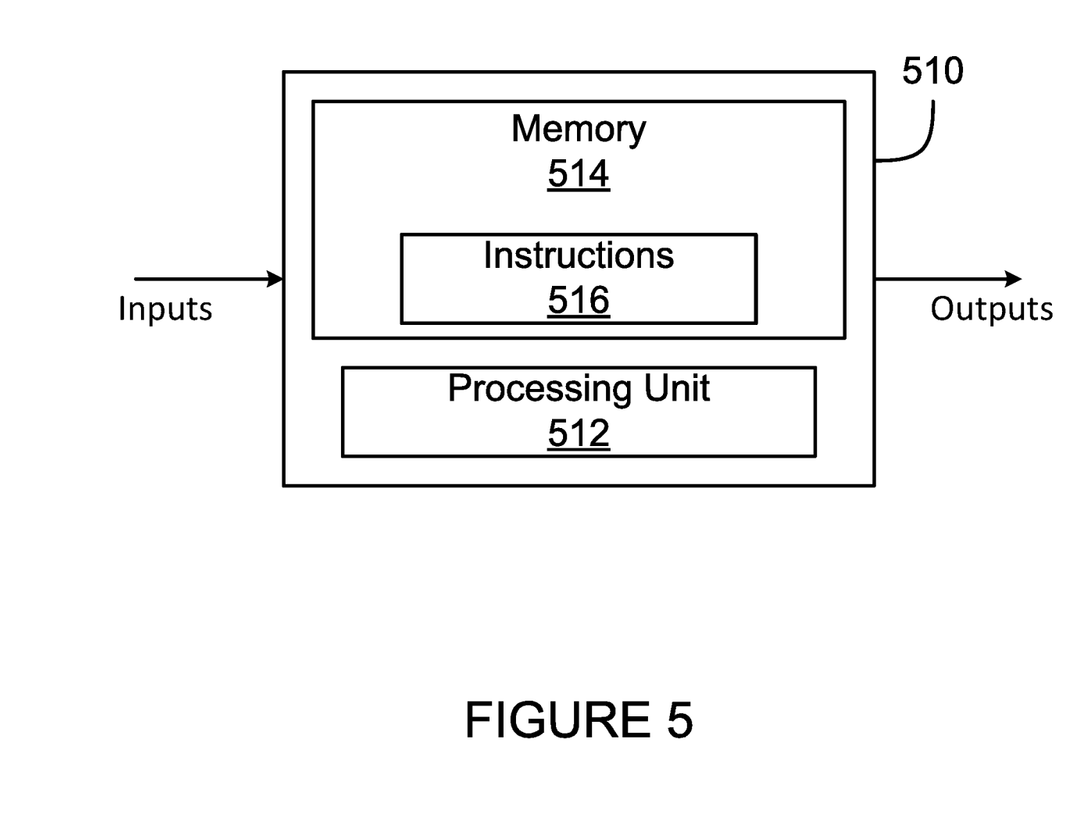
FIG. 5 is a schematic diagram of an example computing system for implementing the powerplant control systems of FIGS. 2A-D in accordance with an embodiment.

With reference to FIG. 5, the method 400 may be implemented by a computing device 510, comprising a processing unit 512 and a memory 514 which has stored therein computer-executable instructions 516. The processing unit 512 may comprise any suitable devices configured to implement the system 300 such that instructions 516, when executed by the computing device 510 or other programmable apparatus, may cause the functions/acts/steps of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

In some embodiments, the computing device 510 can include one or more full-authority digital engine controls (FADEC), one or more propeller electronic control (PEC) units, and the like. In some embodiments, the engine controllers 210, 212, 260, 262 are implemented as dual-channel FADECs. In other embodiments, the engine controllers 210, 212, 260, 262 are implemented as two separate single-channel FADECs. In still further embodiments, one of the engine controllers, for example the engine controller 210, is implemented as a dual-channel FADEC, and the other engine controller, for example the engine controller 260, is implemented as a single-channel FADEC. In such an embodiment, the engine controller 260 may be configured to cause the propeller 170 to operate in a particular default mode, and the engine controller 210 is configured for adjusting the operation of the propeller 120 to synchronize the propeller 120 with the propeller 170.

Additionally, in some embodiments the propeller controllers 220, 270 are implemented as dual-channel PECs, or as two single-channel PECs, or any suitable combination thereof. The unified controllers 230, 232, 280, 282 can be implemented as any suitable combination of FADECs, PECs, and/or any other suitable control devices. In some embodiments, the additional inputs provided by the cockpit controls 206 can be provided via one or more engine interface cockpit units.

The methods and systems for controlling operation of a first propeller of an aircraft described herein may be implemented in a high level procedural or object oriented programming or scripting language, or a combination thereof, to communicate with or assist in the operation of a computer system, for example the computing device 600. Alternatively, the methods and systems for controlling operation of a first propeller of an aircraft may be implemented in assembly or machine language. The language may be a compiled or interpreted language. Program code for implementing the methods and systems for controlling operation of a first propeller of an aircraft may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling operation of a first propeller of an aircraft may also be considered to be implemented by way of a non-transitory computer-readable storage medium having a computer program stored thereon. The computer program may comprise computer-readable instructions which cause a computer, or in some embodiments the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for controlling operation of a first propeller of an aircraft may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling operation of at least a first propeller of an aircraft, the first propeller associated with a first engine, the aircraft further comprising a second propeller associated with a second engine, the method comprising:
    obtaining, at a first unified controller, a first requested engine power for the first engine, the first unified controller configured for controlling the first engine and the first propeller;
    obtaining, at the first unified controller, a second requested engine power for the second engine;
    synchronizing, via the first unified controller, the first propeller with the second propeller by setting a first propeller command for the first propeller based on the second requested engine power; and
    sending, via the first unified controller, the first propeller command for the first propeller.

2. The method of claim 1, wherein obtaining the first requested engine power comprises receiving a first throttle command based on a lever angle for a first throttle lever associated with the first engine.

3. The method of claim 2, wherein obtaining the second requested engine power comprises receiving a second throttle command based on a lever angle for a second throttle lever associated with the second engine.

4. The method of claim 3, wherein the second throttle is a second unified control lever also associated with the second propeller.

5. The method of claim 2, wherein the first throttle is a first unified control lever also associated with the first propeller.

6. The method of claim 1, wherein setting the first propeller command comprises setting the first propeller command to match a second propeller command for the second propeller based on the second requested engine power.

7. The method of claim 6, further comprising sending the second propeller command for the second propeller.

8. The method of claim 1,
    wherein the first propeller is a plurality of first propellers, the first engine is a plurality of first engines, each of the first propellers associated with a respective first engine;
    wherein the second propeller is a plurality of second propellers, the second engine is a plurality of second engines, each of the second propellers associated with a respective second engine;
    wherein synchronizing the first propeller with the second propeller comprises synchronizing the plurality of first propellers with the plurality of second propellers by setting a plurality of first propeller commands for the plurality of first propellers based on the second requested engine power; and
    sending the plurality of first propeller commands for the plurality of first propellers.

9. An aircraft subsystem comprising:
    a first engine, a first propeller, and a first unified control lever associated with the first engine and the first propeller;
    a second engine, a second propeller, and a second unified control lever associated with the second engine and the second propeller;
    a first unified controller configured for controlling the first engine and the first propeller based on a first command from the first unified control lever; and
    a second unified controller configured for controlling the second engine and the second propeller based on a second command from the second unified control lever;

wherein the first unified controller is configured for synchronizing the first propeller with the second propeller based on the second command from the second unified control lever.

10. An aircraft subsystem comprising:
a first engine, a first propeller, and a first unified control lever associated with the first engine and the first propeller;
a second engine, a second propeller, and a second unified control lever associated with the second engine and the second propeller;
a first unified controller configured for controlling the first engine and the first propeller based on a first command from the first unified control lever; and
a second unified controller configured for controlling the second engine and the second propeller based on a second command from the second unified control lever;
wherein the first unified controller and the second unified controller are configured for synchronizing the first propeller and the second propeller together.

* * * * *